United States Patent [19]
Stone et al.

[11] Patent Number: 5,903,859
[45] Date of Patent: May 11, 1999

[54] DYNAMIC MULTI-LINGUAL SOFTWARE MODULE SYSTEM

[75] Inventors: Roderick W. Stone; Richard W. Finch; Robert W. McReynolds, all of Austin, Tex.

[73] Assignee: Dell USA, L.P., Austin, Tex.

[21] Appl. No.: 08/622,807

[22] Filed: Mar. 27, 1996

[51] Int. Cl.⁶ .............................. G06F 17/20; G06F 9/45
[52] U.S. Cl. ................................................. 704/8; 395/704
[58] Field of Search ..................... 704/1, 8–9; 395/701, 395/704, 705

[56] References Cited

U.S. PATENT DOCUMENTS

| | | | |
|---|---|---|---|
| 4,553,205 | 11/1985 | Porchia | 395/701 |
| 5,291,602 | 3/1994 | Barker et al. | 395/101 |
| 5,579,223 | 11/1996 | Raman | 704/2 |
| 5,583,781 | 12/1996 | Chou | 704/8 |
| 5,644,775 | 7/1997 | Thompson et al. | 704/6 |
| 5,664,206 | 9/1997 | Murow et al. | 704/8 |
| 5,678,039 | 10/1997 | Hinks et al. | 704/5 |
| 5,701,487 | 12/1997 | Arbouzov | 395/101 |

OTHER PUBLICATIONS

William S. Hall. "Adapt Your Program For Worldwide Use With Windows Internationalization Support", Microsoft Sys. Journal. Nov/Dec. 1991, pp. 29–45.

*Primary Examiner*—David R. Hudspeth
*Assistant Examiner*—Patrick N. Edouard
*Attorney, Agent, or Firm*—Skjerven, Morrill, MacPherson, Franklin & Friel LLP; Ken J. Koestner

[57] ABSTRACT

A software system facilitates the translation of text strings into multiple languages. The software system includes a macro which substitutes for a text string and a message collection and source update utility which scans the source code, locates the macro in the source code, derives a key relating to the text string and updates a database with the text string and key. The macro is included into a source code.

31 Claims, 7 Drawing Sheets

DYNAMIC MULTI-LINGUAL SOFTWARE MODULE SYSTEM

BACKGROUND OF THE INVENTION

1. Field of The Invention

The invention relates to a method and system for computer software development and distribution. More specifically, the invention relates to a method and system for software development and distribution of software programs in multiple languages.

2. Description of the Related Art

Software programs generally are created and marketed for world-wide distribution. Programs having documentation and a user interface expressed in a single language generally have a limited appeal in many countries of the world. To achieve a world-wide appeal, software is translated to multiple different languages.

Distribution of a software program in multiple languages is not a simple task. Handling of software packages in multiple language versions is a difficult software management issue involving translation of text strings in the software program and then maintaining and shipping several versions of the program. Each version of the program supports a different foreign language.

Conventionally, multiple versions of a program are supported by translating the text strings from each foreign language version of the program from the strings of the native language version. Following translation, the different software versions are supported independently. However, the support of multiple software versions raises the chance for errors, to be introduced into the software, thereby complicating software development and support.

A major problem of a software development and distribution system that supports multiple language versions of a program is that the separate language versions are not portable between users. Thus a single language version of a program has limited usefulness when the program is used by multiple persons, for example in an office environment, who speak different languages.

Various techniques have been employed to manage the support of multiple languages in a software program. The most prevalent technique is to edit the source code from the native language software version and translate each text message into a foreign language counterpart. Another method is to create a predefined message token and insert the token into the source code at a suitable position. Message tokens are replaced at a later time. Each of these techniques has weaknesses. When the source code is edited, inadvertent code changes may occur between the separate software versions, reducing software reliability and possibly causing nonuniform operation among the program versions. The usage of reference tokens and a table of text entries that correspond to the tokens creates the possibility of the ordering of the tokens and table to become nonaligned so that an inappropriate message may be expressed by the program.

Software management of multiple language versions is further complicated when modules are developed by a source external to a software distributor. In many cases, an external source is a vendor that can only supply a module in the native language. Many such vendors supply only object or executable code so that no source code is available for translating into multiple languages.

SUMMARY OF THE INVENTION

In accordance with the present invention, a software system facilitates the translation of text strings into multiple languages. The software system includes a macro which substitutes for a text string and a message collection and source update utility which scans the source code, locates the macro in the source code, derives a key relating to the text string and updates a database with the text string and key. The macro is included into a source code.

In accordance with some embodiments of the invention, the message collection and source update utility further includes a utility for verifying the format of the key and message with respect to a source code type.

In accordance with an embodiment of the invention, the message collection and source update utility derives the key based on the text string, for example, the key may be derived based on a cyclic redundancy check error checking procedure applied to the text string.

In accordance with some embodiments of the invention, the message collection and source update utility further includes a utility for reconciling the text string and the key with an existing language database and adding the text string/key pair to the database so that one text string corresponds singularly and uniquely with one key and a single text string/key pair is included in the database without duplication.

Some embodiments of the invention include a message translation utility with a routine which displays messages to be translated and a routine for writing translated messages to the database. In some embodiments a module load utility is provided which incorporates a routine for selecting languages to be included in a software module, a routine for extracting translations of the selected languages from the database.

In some embodiments of the invention the software system further has a dynamic message selection routine including a routine for designating a language to be expressed by a software module, a routine for loading text for the selected language from the database, a routine operational at execution of the software module for locating a message in the selected language within the loaded text, and a routine for passing the located message to formatting and print routines operational during execution of the software module.

The described method and system achieves numerous advantages. One advantage is that management of software support is greatly simplified since only a single program code base is maintained. Using the described method and system, a single load module is produced that dynamically supports multiple different language segments. It is advantageous that the described method and system automates collection of all text for translation, including text strings that occur in source code, object code or executable modules.

A further advantage is that program code is condensed, both in long-term storage and memory, due to avoidance of redundancy since duplicate messages are filtered. Each message string is translated only once, although a particular string may occur numerous times in a program, saving development time and costs and avoiding the possibility of inconsistent translations of the same text. Memory resources are further conserved because message text for only a single selected language is loaded into memory at one time. Additional languages are available from a load module on long-term storage, such as a hard disk or CD ROM, if and when other languages are desired. However, if multiple languages are desired simultaneously, the software may be easily configured so that the massaging routines are extended to load several languages at one time, if desired. It is advantageous that the software language system is flexibly configured. For example, the native language text may be embedded within a compiled source module or removed from the source module and stored into a language file to reduce the long-term storage capacity of the source module.

It is advantageous that modified messages are automatically detected and the original translation is temporarily saved for review so that any changes are simply verified.

Software translation is advantageously facilitated since messages are stored in the program code storage in the native language so that developers have no need to search through other files to ensure that the number and type of translated replacement parameters match. Furthermore, once a system developer selects a language, translated text is incorporated automatically so that the developer does not provide any tokens. Thus, no typographical error can occur that would result in selection of an incorrect message.

The method advantageously allows a software developer to create messages in a native language and then to select other language support from a language database. Selected languages are automatically included in a software program package.

It is advantageous that an external source vendor who supplies a software module need only provide modules having text in the native language. The software system automatically extracts the text and supplies translated text during a build process of an executable of a software program.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
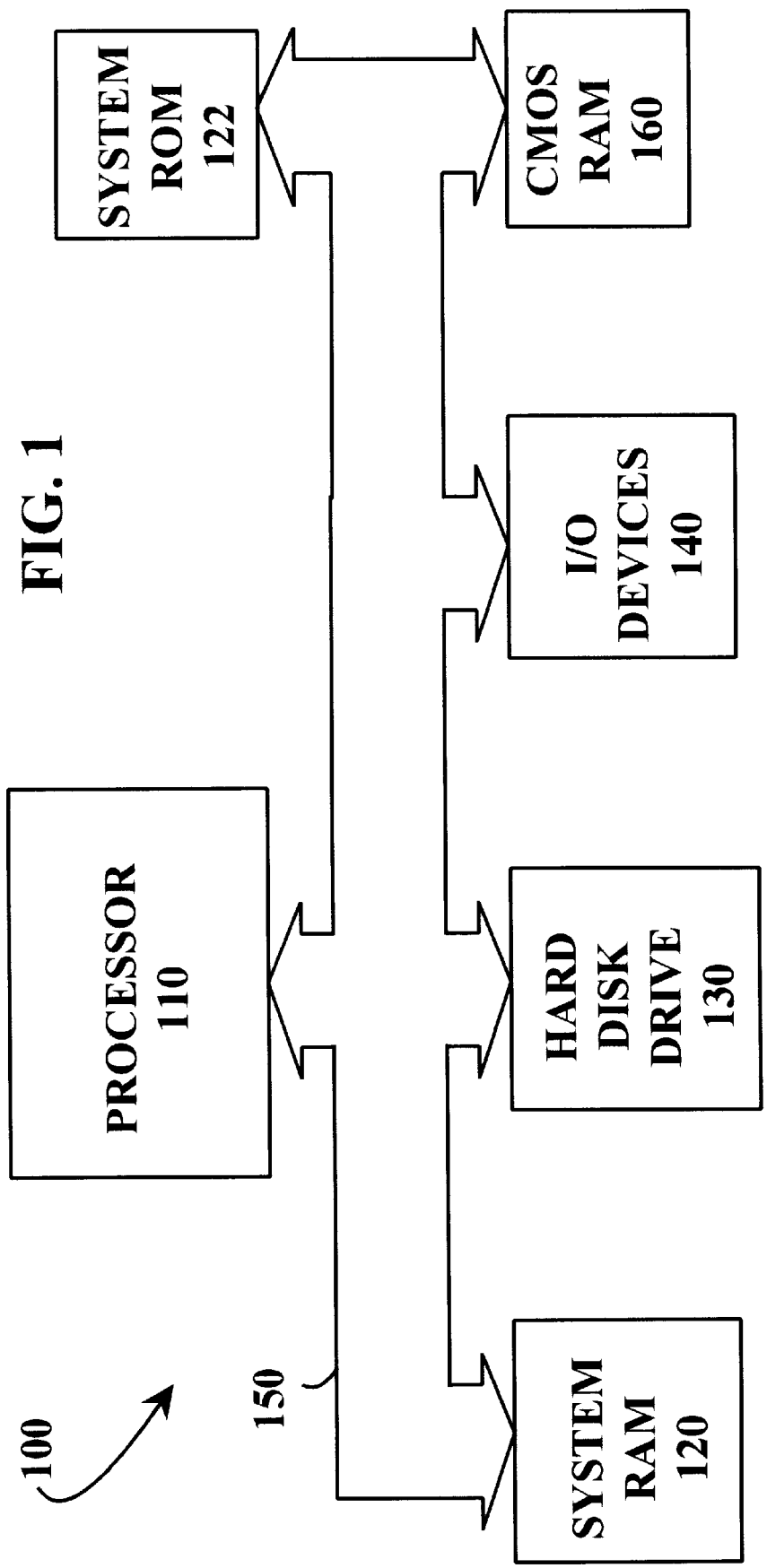
FIG. 1 is a block diagram which depicts computer system hardware upon which a software system for communicating between independent software modules in accordance with an embodiment of the present invention is implemented.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486 or Pentium™ processor, executes the computing operations of the computer system 100.

Figure 2:
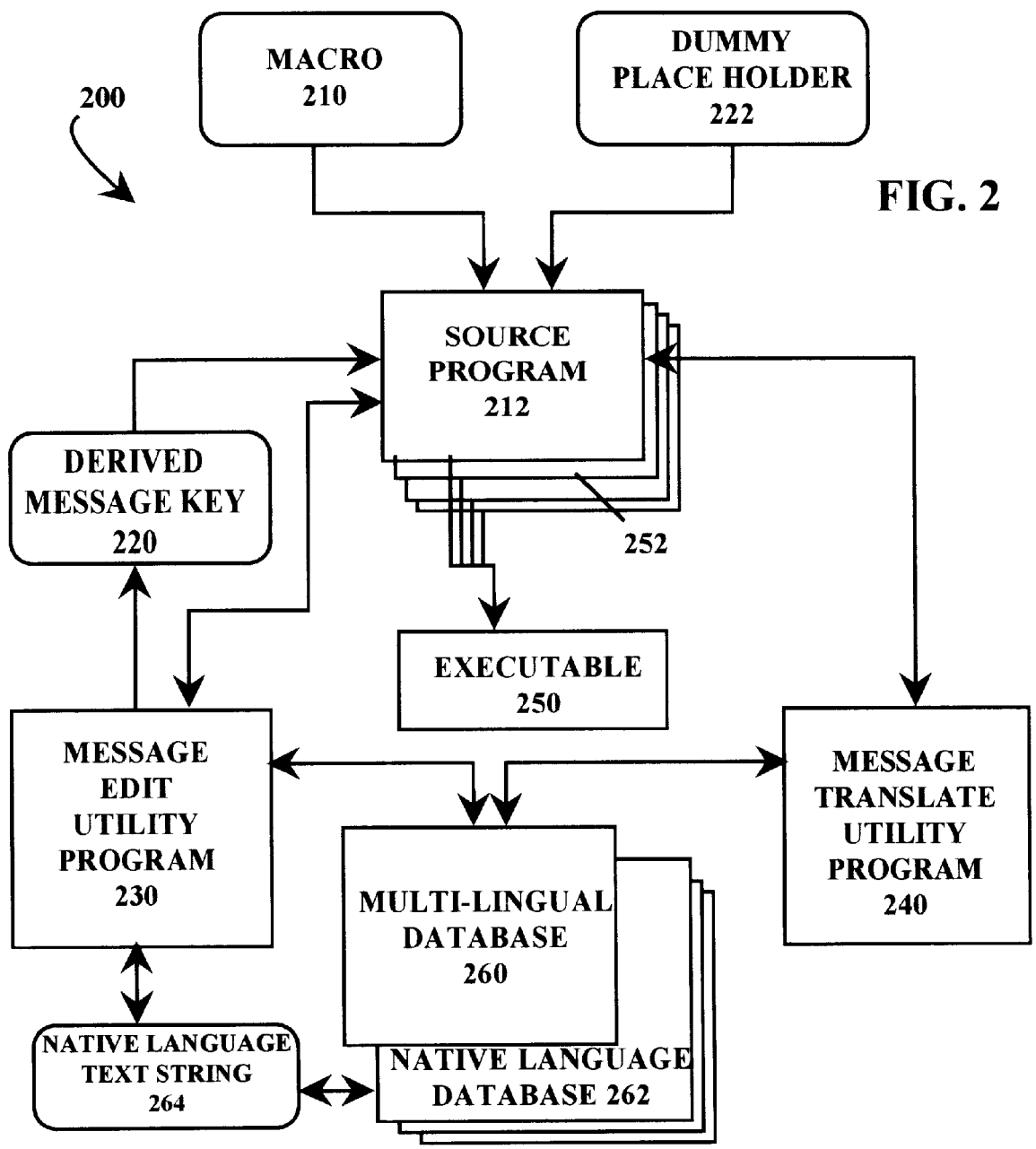
FIG. 2 is a block diagram illustrating a software translation management system in accordance with one embodiment of the present invention.

Referring to FIG. 2, a block diagram illustrates component blocks of a software translation management system 200 including a macro 210, a derived message key 220, a message edit utility program 230 and a message translate utility program 240. The software translation management system 200 typically operates on a source code program 212 of a plurality of source files 252 to generate an executable file 250, generating and using text strings in multiple languages, including native language text strings 264, that are stored in a multilingual database 260. The multilingual database includes a database for one or more languages. One required database is a native language database 262.

The macro 210 is a single, symbolic programming language statement that, when translated, results in a series of machine-language statements. A software developer substitutes the macro in source code program 212 locations where a text string would be placed in conventional software programs. The software developer also inserts a dummy place holder 222 into the source code program 212 location in the vicinity of the macro 210. The dummy place holder 222 ultimately becomes the derived message key 222 after processing by the message edit utility program 230 and the message translate utility program 240.

Once the dummy place holder 222 is inserted, operations relating to the text to be inserted into the dummy place holder 222, including operations such as definition, insertion, modification and translation of a text string, are performed without further updating of the source code.

The macro 210 includes an option field that defines whether the macro 210 is to insert a binary code representing a text string directly into the source code or the macro 210 is to insert a reference to the text string into the source code 212. A program code representative of a typical macro definition follows. For a C/C++ and ASM implementation, a typical macro is:

```
#ifdef MULTILINGUAL
#defineXLATE(a,b) (b)
typedef unsigned int MCH_MSG
#else
#defineXLATE(a,b) (a)
typedef char* MCH_MSG
#endif
MCH_MSG table[ ]={
    XLATE ("xxx",0x0000),
    XLATE ("yyy",0x0000)
    }
. . . .
. . . .
```

```
printf(fGetMessage(XLATE("zzz",0x0000)));
printf(fGetMessage(table[0]));
```
One example of a string that utilizes the macro 210 for various languages is illustrated as follows:

ASM MACRO/USAGE
```
    MACRO XLATE text, key
        DW key
    #ifdef MULTILINGUAL
        DB 0
    #else
        DB text
    #endif
    #endm XLATE
    message: XLATE "xxx",00000h
    . . . .
    . . . .
    PUSH DS
    PUSH OFFSET message
    CALL fGetNessage
    POP BX
    POP ES
    . . . .
    . . . .
```

C++ MACRO/USAGE
```
    #ifdef MULTILINGUAL
    #define XLATE(a,b) ((unsigned long)b)
    #else
    #define XLATE(a,b) ((unsigned long)a)
    #endif
    #endm XLATE
    unsigned long table[ ]={
        XLATE ("xxx",0x0000),
        XLATE ("yyy",0x0000)
        }
    . . . .
    . . . .
    printf(fGetMessage(XLATE("zzz",0x0000)));
    printf(fGetMessage(table[0]));
    . . . .
    . . . .
```

A source code module including the macro 210 and the dummy place holder 222 is complete for usage with the native language alone if multilingual capabilities are not desired. For native language usage alone, the source code module including the macro 210 and dummy place holder 222 is used simply to facilitate software program debugging.

Figure 3:
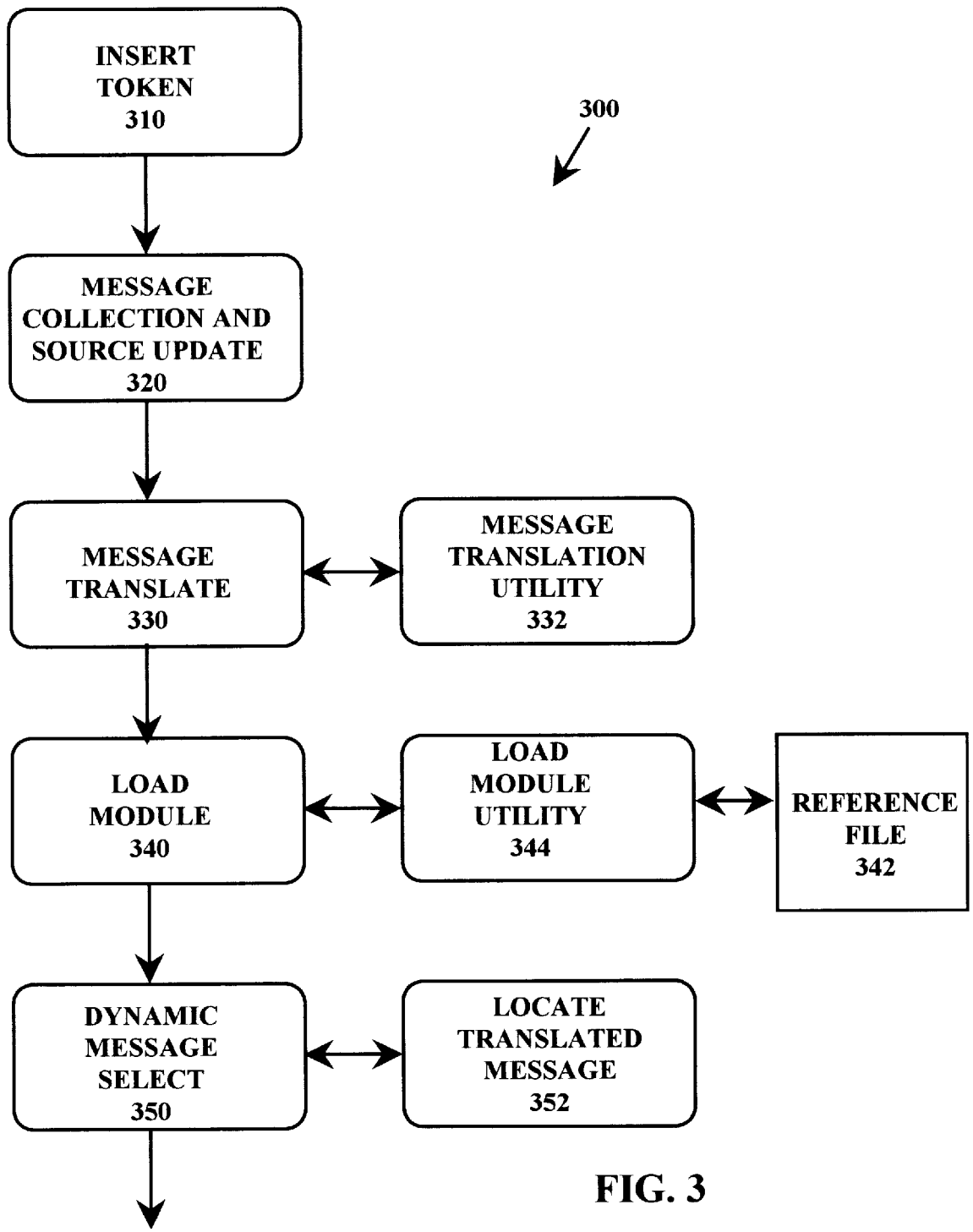
FIG. 3 is a flow chart illustrating an overview of a system for managing multilingual software modules.

Referring to FIG. 3, a flow chart illustrates an overview of a system 300 for managing software modules in multiple languages. Insert token step 310 inserts macros 210 and dummy place holders 222 into source code of source files 252. Message collection and source update step 320 scans the source files 252, locates the macros 210 and verifies the format of the macros 210. A message translation step 330 translates a message into multiple languages. A load module step 340 selects languages that are to be included in a module. A dynamic message selection step 350 functions at execution time to determine which language is operational.

Figure 4:
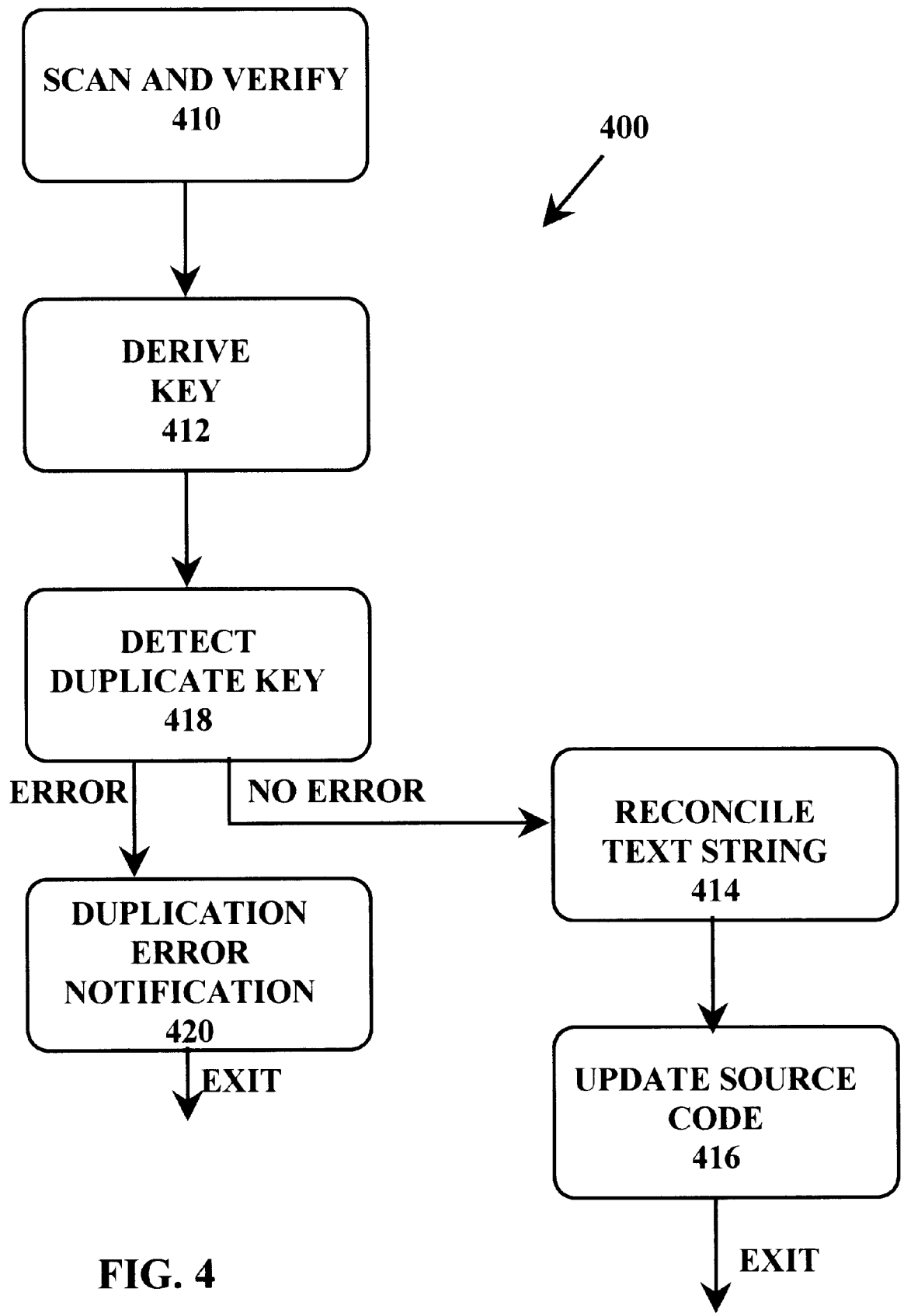
FIG. 4 is a flow chart that depicts steps in a process performed by the message edit utility program shown in FIG. 2.

Insert token step 310 and message collection and source update step 320 are described in detail with reference to FIG. 4 in conjunction with FIG. 2. In FIG. 4 a flow chart depicts steps in a process 400 performed by the message edit utility program 230. The message edit utility program 230 is used during the process of building an executable file 250 from one or more source files 252. The message edit utility program 230 includes a plurality of fimctions for collecting messages, reconciling a multilingual database 260 and constructing various types of files. These functions are requested by a software developer during the build process. First, in a scan and verify step 410, the message edit utility program 230 scans each of the source files 252, locates the macro 210 within the source files. and verifies the format of the macro 210 for the type of source 252.

A utility program that performs the scan and verify step 410 has a syntax such as:
  MSGEDIT keylist <keylist file> from <source_list> using <database>,
  MSGEDIT create <devmod> from <source_list>,
  MSGEDIT create <devmod> from <source_list> using <database>, or
  MSGEDIT reconcile <database> with <source_list>,
where <devmod> designates a module-specific language file that is built to include multilingual support, <source_list> is a list of source files that are included in the software module, and <database> designates a language database such as a single language database of the multilingual database 260.

In a derive message step 412, the message edit utility program 230 operates on the verified macro 210 at the command of a software developer to derive a message key 220. The message edit utility program 230 accesses a native language text string 264 from a native language database 262 which is similar to but separate from the multilingual database 260 in some embodiments. The message edit utility program 230 derives the message key 220 based on the native language text string in the native language database 262 that corresponds to a particular macro 210. The message key 220 represents the text string in the multilingual database 260. In one embodiment, the message edit utility program 230 uses an algorithm based on a cyclic redundancy check (CRC-16) error checking procedure to derive the message key 220. When the message key 220 has been derived, a reconcile text string step 414 reconciles the text string 264 and the message key 220 with the native language database 262 and adds additional new messages as new messages are encountered and adds additional error reports as error conditions are detected.

In update source code step 416, the source code of a source file 252 is updated with the derived message key 220 so that any changes to the text string are detected automatically during subsequent build processes. In detect duplicate key step 418, the message edit utility program 230 detects whether a single message key is duplicated from a plurality of different text strings. Any hashing algorithm, a transformation of a number into a key, possibly produces such duplications. When detect duplicate key step 418 detects such an error condition, duplication error notification step 420 interactively signals the error condition to the software developer, permitting data to be entered or flow of the utility program 230 to be modified during execution. The software developer responds to the duplicate key error condition by modifying the text string slightly so that the key is changed.

The message edit utility program 230 operates on an object code and executable module as well as source code. For object code and executable file load modules, the source code is not available, the message edit utility program 230 extracts native language text strings from the load module or, if a special key list file was used to build the load module, the special key list file. In circumstances where object code or executable modules are accessed by the message edit utility program 230, updating of the source code is achieved by supplying the developer of the source code that is compiled into the object code or executable file with a copy of the message extraction and source updating utility of the message edit utility program 230.

Figure 5:
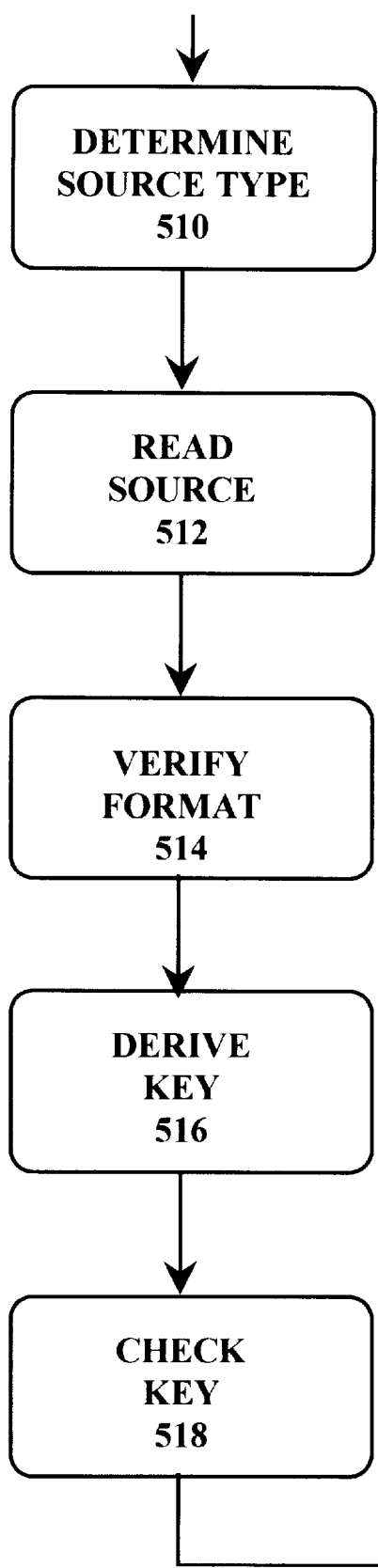
FIG. 5 is a flow chart that depicts steps in a process performed by a message collection and reconciliation utility routine of the message edit utility program that operates on ASM and C/C++ source files.
Figure 5:
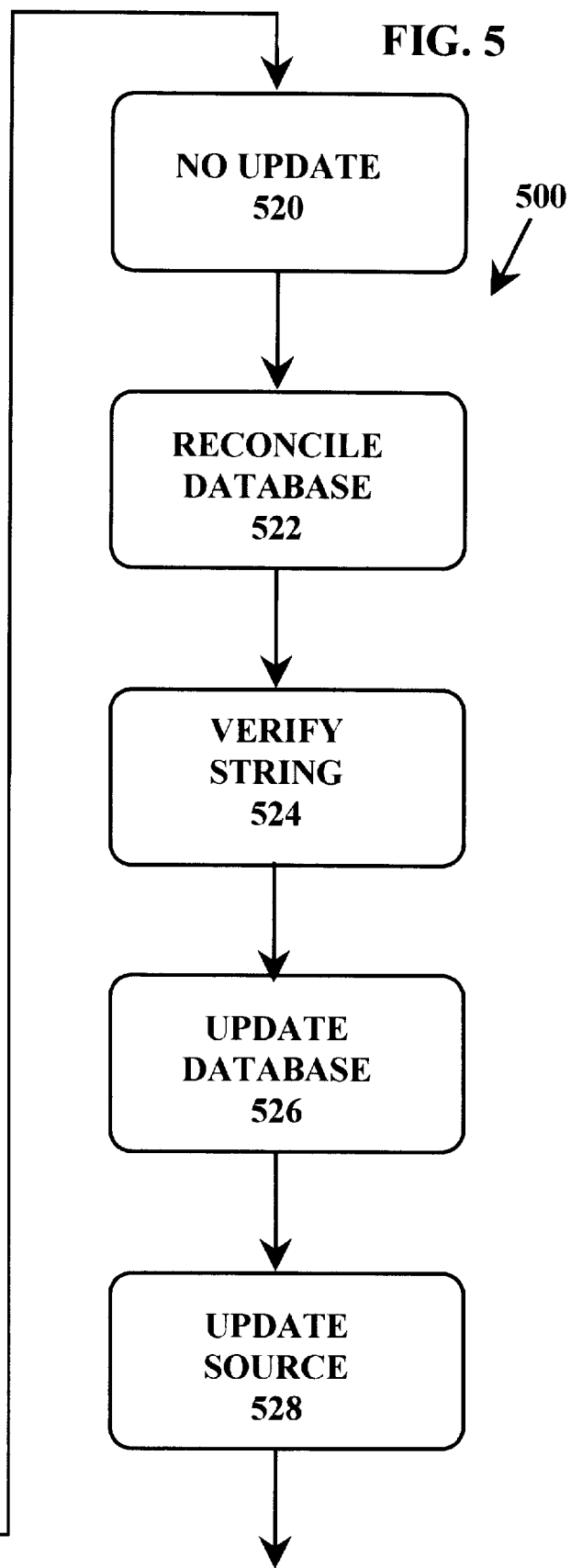

Referring to FIG. 5 in conjunction with FIG. 2, a flow chart depicts steps in a process performed by a message collection and reconciliation utility routine 500 of the message edit utility program 230 operating on ASM and C/C++ source files. In determine source type step 510, the message collection and reconciliation utility routine determines whether the source file is an ASM or C/C++ type file. In a read source step 512, the source file is read until an XLATE token is detected or an end-of-file message is encountered. In verify format step 514, after an XLATE token is found the message collection and reconciliation utility routine continues scanning the source file to verify that the format of the source file is correct for the particular type of source file. In derive key step 516, a new message key 220 is derived based on the text string. Check key step 518 determines whether the newly derived message key matches the existing message key that previously was stored to the source file. If the newly derived key matches the existing message key, then the source has not been updated so that no update step 520 terminates the message collection and reconciliation utility routine.

Otherwise, the newly derived and previously existing keys are different and reconcile database step 522 reconciles the database. If the newly derived key already exists in the native language database 262, then verify string step 524 verifies that the message string used to create the message key matches the text string in the native language database 262 to ensure that the key derivation algorithm has not failed. Otherwise, the newly derived message key does not exist in the native language database 262, update database step 526 writes the new message key and the text string used to derive the key to the native language database 262. In update database step 526, all additional language entries in the multilingual database 260 are set to a NULL value since no translations exist for the new message. To avoid completely losing any translations for a simple message change, the previously existing key is utilized. For example, if the source file has an existing previous message key with a nonzero value, then the translations are copied from the previously existing record to the new record in the multilingual database 260. The translations in the multilingual database 260 may have varying degrees of correctness so each translation that is copied from the previously existing record to the new record is flagged as being possibly incorrect.

Furthermore, when the newly derived message key and previously existing message key are different, update source step 528 updates the source file with the newly derived message key. The message collection and reconciliation utility routine then continues with read source step 512.

Figure 6:
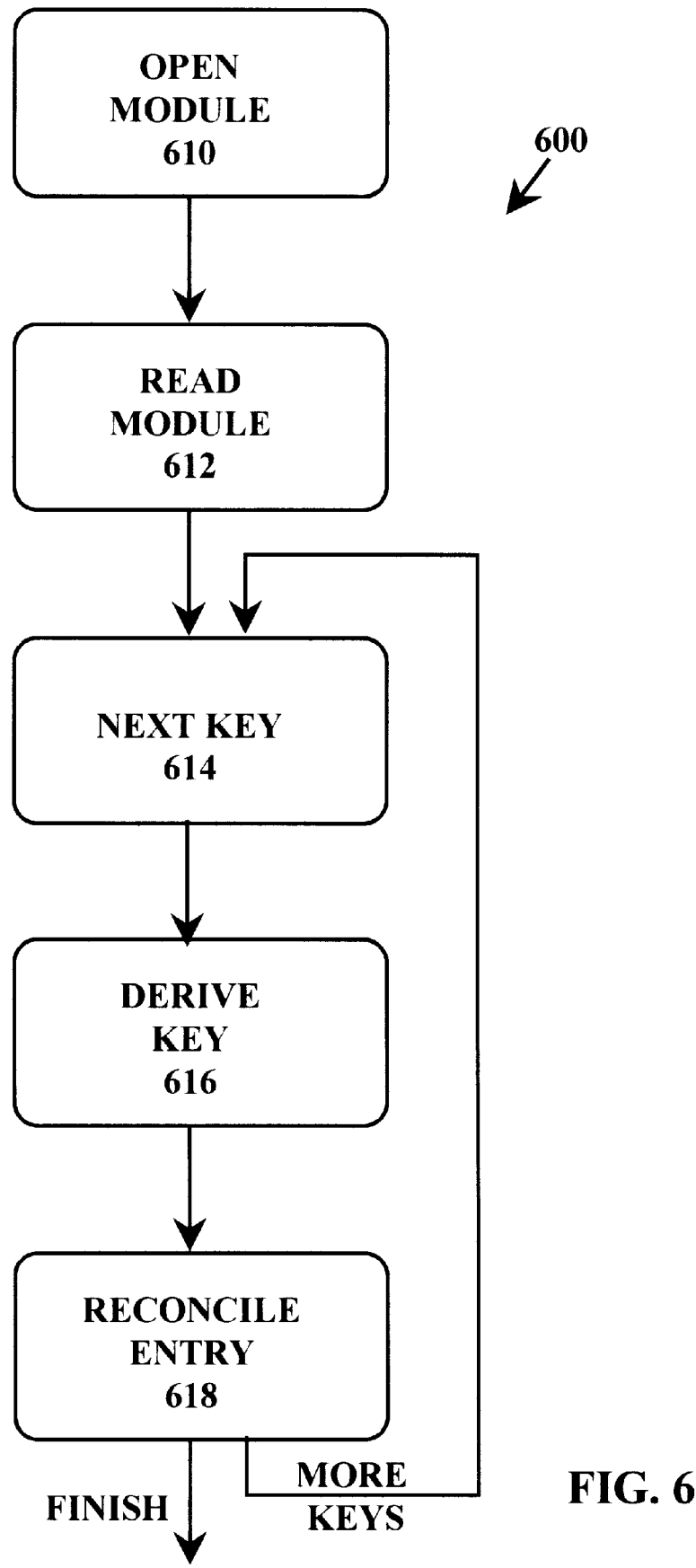
FIG. 6 is a flow chart that illustrates steps in a process performed by a message collection and reconciliation utility routine of the message edit utility program that operates on object code and executable load modules.

Referring to FIG. 6 in conjunction with FIG. 2, a flow chart depicts steps in a process performed by a message collection and reconciliation utility routine 600 of the message edit utility program 230 operating on object code and executable load modules. Open module step 610 opens the load module and, once the module is open, locates and verifies a header of the module. Read module step 612 reads a key list, index table and text corresponding to a first language, language 0. Repeating for each message key in the key list of the module, as directed by next key step 614, derive key step 616 derives a message key based on the text string and verifies whether the derived key matches the key from the load module. Verification ensures that the load module and native language database 262 were created using the same key derivation algorithm. In reconcile entry step 618, the newly derived message key is reconciled with the native language database 262.

Special key files are library modules which are typically used when source code is not available. A key file is created when a library routine is used so that the system developer who uses the library routine determines which messages constitute the library routine without having access to the source code. For a special key file to be used, the native language database 262 must already include the messages corresponding to any message keys. The special key files contain utility information determining which messages are to be included with a load module when the multilingual database 260 is constructed.

Figure 7:
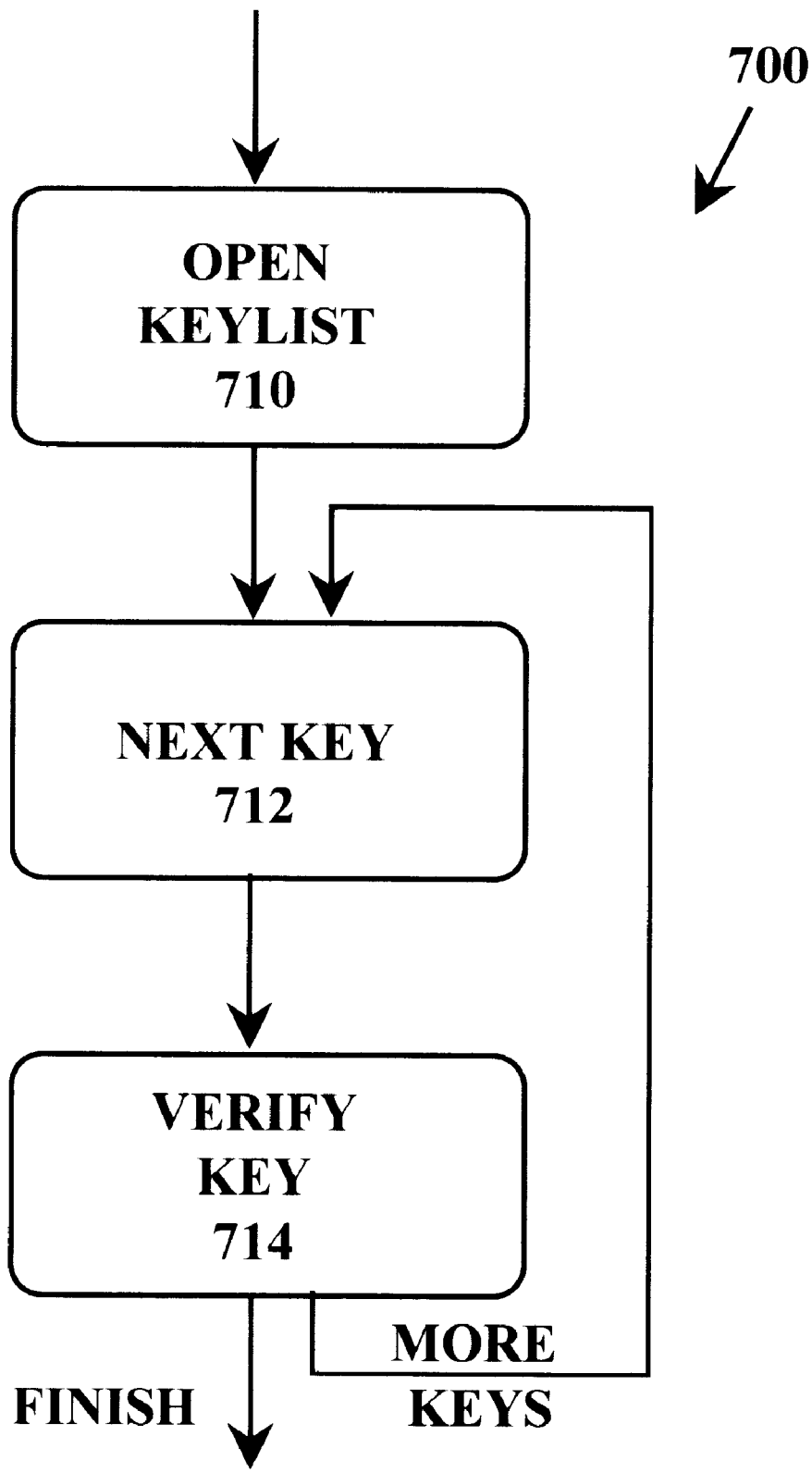
FIG. 7 is a flow chart that illustrates steps in a process performed by a message collection and reconciliation utility routine of the message edit utility program that operates with special key files.

Referring to FIG. 7 in conjunction with FIG. 2, a flow chart depicts steps in a process performed by a message collection and reconciliation utility routine 700 of the message edit utility program 230 operating with special key files. Open keylist step 710 opens a keylist in a special key file, then locates and verifies the header of the key file. Verify key step 714 verifies that the message key exists in the native language database 262 for a key, repeating for each key in the keylist as directed by next key step 712.

A utility program that performs the message collection and reconciliation operations and creates special keyfiles has a syntax such as:

MSGEDIT keylist <keylist> from <source_list> using <database>, where <keylist> designates a particular key list, <source_list> is a list of source files that are included in a software module and <database> designates a language database such as a single language database of the multilingual database 260.

A key file has a format, as follows:

Header

Key

Key

The header has a format, as follows:

defineMKY_FILE_REV 1 defineMKY_FILE_SIG "Message Key"

struct sMkyHeader

{ char m_signature(18); // "Message Key"

char m_eof; // 0x1A char m_revision; // File revision int m_keyListNum; // Number of keys in the file int m_checksum; // Header checksum

};

Each key is a single datum element, described as follows:

usigned int key;

If the native language database 262 does not contain the necessary messages, the library routine may alternatively be made available in combination with a Device Module Data File. The Device Module Data File furnishes a run-time module with multilingual messages. An external provider of software that supplies object-only modules uses the Device Module Data File to furnish a software recipient with the keys and messages that make up the object module or modules. When the Device Module Data File is used with an executable load module, the Device Module Data File is copied to the end of the load module where application program interfaces (APIs) can locate the Device Module Data File. The format of the Device Module Data File is, as follows:

Header
Key List
Language 0/Index Table
Language 0/Messages
. . .
Language 15/Index Table
Language 15/Messages
File Size The header contains a text string and other identification information, including a language pointer array (m_langPointer) and a language size array (m_langSize). The language pointer array (m_langPointer) is used to determine where the index and text for each language is stored in the Device Module Data File. The language size array (m_langSize) is used to determine the number of bytes a language occupies in the Device Data Module File, including an index table and text. The format of the header is, as follows:

```
#defineMSG_DBASE_REVISION 1
#defineMSG_DBASE_SIGNATURE"signature"
struct sMdVHeader
{
  char m_signature(14); // "signature"
  char m_eof; // 0x1A;
  char m_revision; // File revision;
  char m_unused(10);
  int m_keyListSize; // Size (in bytes) of key list area
  int m_keyListNum; // Number of keys in the file
  int m_checksum;
  long m_langPointer (MSG_MAX_LANGUAGES);
  int m_langSize (MSG_MAX_LANGUAGES);
};
```

The key list includes a key for each message in the Device Module Data File. The position of a key in the key list is an index into a Language Specific Index Table. The format of a key is, as follows:

unsigned int key;

A Language Specific Index Table is created for each language that has at least one defined message. The Language Specific Index Table is located using the m_langpointer array in the header. The Language Specific Index Table storage contains a list of offset values for each message in a Language Specific Message storage. This offset is the storage offset from the beginning of the Language Specific Message storage to the text string that the key represents. If a key is not translated, the Language Specific Index Table storage is constructed to contain the native language message. Accordingly, the Language Specific Index Table storage corresponds one-for-one with the entries in Language Specific Index Tables for other languages. The Language Specific Index Table for each language is positioned in storage to always end on a 16-byte boundary. The format of the Language Specific Index Table is, as follows:

unsigned int textoffset;

The Language Specific Message Area is a list of C/C++ text strings that follows directly behind the Language Specific Index Table that describes the Language Specific Message Area. Information in the Language Specific Message Area is translated to a target language and may include "printf" type format identifiers as part of the text string. The Language Specific Message Area for each language is positioned in storage to always end on a 16-byte boundary.

The entire size of the Device Module Data File is designated by the File Size. The File Size is used to allow an application program interface (API) to locate the header when the data file is copied to the end of a load module. The format of a File Size is, as follows:

unsigned long fileSize;

All keys, text and translated text are stored in a Language Database. For many implementations, a single Language Database is shared among many applications so that duplicate messages are not translated multiple times. Keys and text entries are automatically added to the Language Database by a module build utility. Upon completion of all key and text entries, the Language Database is sent to a language translation specialist who supplies translated text corresponding to each key and text pair using another utility. The Device Module Data File finishes storage for storing multilingual messages. In one embodiment, the Language Database file has a simple proprietary format. In other embodiments, the Language Database File is implemented using one of a plurality of popular relational databases and database utilities made available with the relational databases. The relational database utilities are modified to use a suitable interface to the Language Database.-The Language Database has a format, as follows:

Header
Record 0
Record 1
.
.
.
Record N

The header contains a text string and other associated identification information. An m_LangMask field is a bitmap that is used to determine which language of a plurality of languages can be placed into the Language Database. The m_langMask field is primarily used during creation of separate databases that are sent out for translation. The format of the header is, as follows:

```
#defineMSGDBAS_DB3ASE_REVISION 1
#defineMSGDBAS_DBASE_SIGNATURE "database"
struct sMsgdbasFileHeader
{
  char m_signature(20); // "signature"
  char m_eof; // 0x1A;
  char m_revision; // File revision;
  int m_checksum; // Checksum of the header
  unsigned int m_langMask; // Legal language mask
  char m_unused(6);
}
```

The Language Database optionally contains several types of records. Each record contains a portion that is common to all records in the Language Database. Records are accessed only by program code that manages the Language Database. Thus, data in the records is not accessible by call instructions. The format of the Language Database records is, as follows:

```
#defineMSGDBAS_TYPE_KEY 0x55 // Key record
#defineMSGDBAS_TYPE_KEY 0x77 // Text record
#defineMSGDBAS_TYPE_KEY 0x99 // Invalid record
#defineMSGDBAS_TYPE_KEY 0x44 // Free space record
struct sMsgdbasCommonHeader
{
  unsigned char m_type; // Record type
  unsigned char m_rsvd, // Reserved (not yet used)-0 value
  int m_size; // SIze of record, including the header
```

};

When a record is deleted or reallocated to another location in the Language Database, a free space record is created at the location of the deleted or reallocated record. Another record may be written to the free space record location, removing or reducing size of the free space record.

Message information is stored in a text record. A text record includes a data portion that directly follows the common header. The data portion is typically a C/C++ text string.

A key record defines the linkage between a key and a message text string. Many members of a key record are declared as private members and are therefore accessed only by program code that manages the Language Database. The private members of the key record are, in fact, used to manage the Language Database.

The private members of the key record are not accessible by call instructions. The key record is used to manage access to elements stored in the Language Database. For example, the first element of a particular message, the first element designated by m_langpointers, is reserved for text used to derive the key. Modification of this first element is not allowed.

The key record includes a public key portion (sMsgdbasPubKeyRec) which stores data that is exchanged from a caller when a caller requests a record.

The key record also includes language flags (m_langFlags) that serve as flag bytes for each language.

The format of the key record is, as follows:

struct sMsgdbasKeyRecord
{
sMsgdbasCommonHeader m_header; // Type/size portion
sMsgdbasPubKeyRec m_pubKeyRec; // User modifiable record
long m_langPointers(MSG_MAX_LANGUAGES); // Language text location
};
struct sMsgdbasPubKeyRec
{
unsigned int m_key; // Key value
unsigned char m_langFlags MSG_MAX_LANGUAGES)
// Flag byte for each lang
};
// Language flags
define MSGDBAS_LFLAG_EXISTS 0x80 // Language exists for key
define MSGDBAS_LFLAG_NEEDXLAT 0x40 // Language to be examined
define MSGDBAS_LFLAG_USER1 0x02 // Reserved for user
define MSGDBAS_LFLAG_USER0 0x01 // Reserved for user Referring again to FIG. 3, the message translation step 330 is operational after all messages have been collected. Message translation step 330 translates a message into multiple languages, as desired. The message translation step 330 is realized using a message translation utility 332. The message translation utility 332 includes an interactive option which determines whether all messages are displayed or only messages that are to be translated are displayed, permitting data to be entered or flow of the message translation utility 332 to be modified during execution. This option allows a software developer to efficiently perform translations without examining every message. The multilingual database 260 is optionally created to contain only certain selected languages or can be restricted so that messages in the native language database 262 cannot be edited, modified, added or deleted.

Initially, a separate database may be created for each language. Having multiple single-language databases is advantageous for avoiding the error of incorrectly supplying the wrong language to a module. Multiple single-language databases is particularly advantageous for source programs that are developed by an external source and implement only a few languages, such as the native language alone or the native language and one other language. The multiple single-language databases are later merged into the multilingual database 260 and then discarded. A further advantage of having multiple single-language databases is that a database may be sent to several translators to allow multiple translations to be performed in parallel, thereby improving a product's time-to-market.

Various utility programs are used to configure the various language databases of the multilingual database 260. For example, a new database <new_database> is initialized with a language mask <language_mask> to define the language of the database using a database initialization utility having a syntax, as follows:

MSGEDIT initialize <new_database> using <language_mask>.

A "rebuild" utility is similar to the initialize utility but is typically requested to include a source file that already has defined tokens into a database. The rebuild utility is useful for flagging errors that occur when messages are unintentionally deleted and for recreating a damaged database without requiring editing of the source file and initializing the keys to a starting point. The default behavior of utilities including create, reconcile, keylist and the like is to generate an error notification when a message that has a defined key cannot be located in the database. The rebuild utility is overrides the default behavior. The rebuild utility has a syntax, as follows:

MSGEDIT rebuild <database> with <source_list>.

An existing database <database> is compressed into a new database <new_database> using a compress utility having a syntax, as follows:

MSGEDIT compress <database> into <new_database>.

Message entries of a single language database <tran_database> are written from a multiple language database <database> with a language mask <language_mask> designating the single language using a database export utility having a syntax, as follows:

MSGEDIT export <database> into <tran_database> using <language_mask>.

Message entries of a single language database <tran_database> are added to a multiple language database <database> using a database export utility having a syntax, as follows:

MSGEDIT import <tran_database> from <database>.

The load module step 340 selects languages that are to be included in a module, extracts translated text strings from the multilingual database 260 and builds a simple reference file 342 that is attached to the module. Messages that are included with each module are determined by the source files that are combined to form the module. The load module step 340 is realized using a load module utility 344 which extracts information from the source files and the special key files. The load module utility 344 is automatically invoked so that intervention of the software developer is not necessary.

The dynamic message selection step 350 functions at execution time to determine which language is operational. To determine which language a software developer intends to implement, typically either an option menu is presented to a software developer awaiting a response or a default selection is made in accordance with the operating system under which the software translation management system 200 is implemented. The module loads the text for the selected language from the multilingual database 260. When the executable software program of the module executes the code that was inserted by the macro 210, the software program simply passes the message key 220 corresponding to the macro 210 to a locate translated message utility 352 which locates the translated message in the loaded language area of the multilingual database 260. The located message is then available for passing to formatting routines and print routines as needed.

While the invention has been described with reference to various embodiments, it will be understood that these embodiments are illustrative and that the scope of the invention is not limited to them. Many variations, modifications, additions and improvements of the embodiments described are possible.

What is claimed is:

1. A computer system comprising:

a processor;

a storage coupled to the processor, the storage for storing a source code; and a software system executable on the processor, the software system including:

a macro which substitutes for a text string, the macro for inclusion into the source code; and a message collection and source update utility which scans the source code, locates the macro in the source code, derives a key relating to the text string and updates a database with the text string and key.

2. A computer system according to claim 1 wherein the macro includes:

an option instructing the macro to embed text corresponding to the macro at the position of the macro in the source code or to insert a key representing the text string.

3. A computer according to claim 1 wherein the message collection and source update utility further includes:

a utility for verifying the format of the key and message with respect to a source code type.

4. A computer according to claim 1 wherein the message collection and source update utility includes a routine for deriving the key based on the text string.

5. A computer according to claim 1 wherein the message collection and source update utility includes a routine for deriving the key based on a cyclic redundancy check error checking procedure applied to the text string.

6. A computer system according to claim 1 wherein the message collection and source update utility further includes:

a utility for reconciling the text string and the key with an existing language database and adding the text string/key pair to the database so that one text string corresponds singularly and uniquely with one key and a single text string/key pair is included in the database without duplication.

7. A computer system according to claim 1 further comprising:

a message translation utility including a routine for displaying messages to be translated and a routine for writing translated messages to the database.

8. A computer system according to claim 1 further comprising:

a module load utility including a routine for selecting languages to be included in a software module, a routine for extracting translations of the selected languages from the database.

9. A computer system according to claim 1 further comprising:

a dynamic message selection routine including a routine for designating a language to be expressed by a software module, a routine for loading text for the selected language from the database, a routine operational at execution of the software module for locating a message in the selected language within the loaded text, and a routine for passing the located message to formatting and print routines operational during execution of the software module.

10. A computer system comprising:

a processor;

a storage coupled to the processor, the storage for storing a source code and a database; and a utility software program executable on the processor for configuring an executable module with text strings in a selected plurality of languages, the utility software program including:

a module build routine which builds an executable module including code derived from a message token in the source code;

an interactive input routine for interactively selecting one or more languages to be included with the executable module;

a text string extraction routine which extracts translated text strings of the selected languages from a multiple language database;

a reference file build routine which builds a reference file including the extracted translated text strings of the selected languages; and a file attachment routine for attaching the reference file to the executable module.

11. A computer system comprising:

a processor;

a storage coupled to the processor, the storage for storing a source code and a database; and a utility software program executable on the processor for dynamically selecting text string messages from a multilingual database for operation of a software module, the utility software program including:

a source code scanning routine which scans the source code to locate a message token within the source code, the message token being associated with a text string;

a key derivation routine for deriving a message key based on the text string; and a reconciliation routine for reconciling the message key and the text string with the database;

a language designation routine which designates a language to be expressed by a software module;

a text loading routine which loads text for the selected language from the database;

a message locating routine utilizing the source code scanning routine and operational at execution of the software module which locates a message in the selected language within the loaded text; and a message passing routine which passes the located message to formatting and print routines operational during execution of the software module.

12. A method of operating a computer system to incorporate text strings of a selected language of a plurality of languages into a software executable code, the computer system including a processor and a storage coupled to the processor and storing a source code and a database, the method comprising:

substituting a macro for a text string in the source code;

scanning the source code;

locating the macro in the source code;

deriving a key relating to the text string; and updating the database with the text string and key.

13. A method according to claim 12 further comprising:

instructing the macro to alternatively imbed text corresponding to the macro at the position of the macro in the source code; or instructing the macro to insert a key that represents the text string.

14. A method according to claim 12 further comprising:

verifying the format of the key and message with respect to a source code type.

15. A method according to claim 12 wherein the key deriving operation comprises an operation of deriving the key based on the text string.

16. A method according to claim 12 wherein the key deriving operation comprises an operation of deriving the key based on a cyclic redundancy check error checking procedure applied to the text string.

17. A method according to claim 12 further comprising:

reconciling the text string and the key with an existing language database;

adding the text string/key pair to the database so that one text string corresponds singularly and uniquely with one key and a single text string/key pair is included in the database without duplication.

18. A method according to claim 12 further comprising:

displaying messages to be translated; and writing translated messages to the database.

19. A method according to claim 12 further comprising:

selecting languages to be included in a software module; and extracting translations of the selected languages from the database.

20. A method according to claim 12 further comprising:

designating a language to be expressed by a software module;

loading text for the selected language from the database;

locating a message in the selected language within the loaded text; and passing the located message to formatting and print routines operational during execution of the software module.

21. A computer program product for use in a computer system having a processor, a storage coupled to the processor and for storing a source code, and a software system executable on the processor, the computer program product comprising:

a computer usable medium having computable readable code embodied therein including:

a macro which substitutes for a text string, the macro for inclusion into the source code; and a message collection and source update utility which scans the source code, locates the macro in the source code, derives a key relating to the text string and updates a database with the text string and key.

22. A computer program product according to claim 21 wherein the macro includes:

an option instructing the macro to embed text corresponding to the macro at the position of the macro in the source code or to insert a key representing the text string.

23. A computer program product according to claim 21 wherein the message collection and source update utility further includes:

a utility for verifying the format of the key and message with respect to a source code type.

24. A computer program product according to claim 21 wherein the message collection and source update utility includes a routine for deriving the key based on the text string.

25. A computer program product according to claim 21 wherein the message collection and source update utility includes a routine for deriving the key based on a cyclic redundancy check error checking procedure applied to the text string.

26. A computer program product according to claim 21 wherein the message collection and source update utility further includes:

a utility for reconciling the text string and the key with an existing language database and adding the text string/key pair to the database so that one text string corresponds singularly and uniquely with one key and a single text string/key pair is included in the database without duplication.

27. A computer program product according to claim 21 further comprising:

a message translation utility including a routine for displaying messages to be translated and a routine for writing translated messages to the database.

28. A computer program product according to claim 21 further comprising:

a module load utility including a routine for selecting languages to be included in a software module, a routine for extracting translations of the selected languages from the database.

29. A computer program product according to claim 21 further comprising:

a dynamic message selection routine including a routine for designating a language to be expressed by a software module, a routine for loading text for the selected language from the database, a routine operational at execution of the software module for locating a message in the selected language within the loaded text, and a routine for passing the located message to formatting and print routines operational during execution of the software module.

30. A computer program product for use in a computer system having a processor, and a storage coupled to the processor for storing a source code and a database, the computer program product comprising:

a computer usable medium having computable readable code embodied therein including a utility software program for configuring an executable module with text strings in a selected plurality of languages, the utility software program including:

a module build routine which builds an executable module including code derived from a message token in the source code;

an interactive input routine for interactively selecting one or more languages to be included with the executable module;

a text string extraction routine which extracts translated text strings of the selected languages from a multiple language database;

a reference file build routine which builds a reference file including the extracted translated text strings of the selected languages; and a file attachment routine for attaching the reference file to the executable module.

31. A computer system comprising:

a processor;

a storage coupled to the processor, the storage for storing a source code and a database; and a utility software program executable on the processor for dynamically selecting text string messages from a multilingual database for operation of a software module, the utility software program including:

a macro which substitutes for a text string, the macro for inclusion into the source code; and a message collection and source update utility which scans the source code, locates the macro in the source code, derives a key relating to the text string and updates a database with the text string and key;

a language designation routine which designates a language to be expressed by a software module;

a text loading routine which loads text for the selected language from the database;

a message locating routine operational at execution of the software module which utilizes the message collection and source update utility to locate a message in the selected language within the loaded text; and a message passing routine which passes the located message to formatting and print routines operational during execution of the software module.

* * * * *